United States Patent [19]

Stuhr

[11] 3,943,712

[45] Mar. 16, 1976

[54] CONTROL SYSTEM FOR AN INTERNAL-COMBUSTION ENGINE AND STEPLESS TRANSMISSION SYSTEM

[75] Inventor: Hans-Waldemar Stuhr, Aschaffenburg, Germany

[73] Assignee: Linde Aktiengesellschaft, Wiesbaden, Germany

[22] Filed: July 16, 1974

[21] Appl. No.: 488,928

[30] Foreign Application Priority Data
Aug. 13, 1973 Germany............................ 2340937

[52] U.S. Cl. .................... 60/327; 60/431; 60/445; 60/452; 60/465
[51] Int. Cl.² ........................................ F16H 39/46
[58] Field of Search ............. 60/327, 431, 448, 451, 60/452, 468, 906, 445, 465; 180/70 R, 77 R, 66 R; 74/843, 856

[56] References Cited

UNITED STATES PATENTS

| | | | |
|---|---|---|---|
| 3,003,309 | 10/1961 | Bowers et al. ......................... | 60/431 |
| 3,450,224 | 6/1969 | Griesenbrock.................... | 60/431 X |
| 3,788,063 | 1/1974 | Kempson et al.................. | 60/431 X |

*Primary Examiner*—Edgar W. Geoghegan
*Attorney, Agent, or Firm*—Karl F. Ross; Herbert Dubno

[57] ABSTRACT

A stepless, preferably hydrostatic, transmission is provided for an internal-combustion engine and the system is controlled by an operating member. A mechanism connects the members to the transmission and the engine so that both the engine and the transmission controls respond to this member. Means is provided for affecting the linkage in response to the torque on the transmission shaft, preferably in dependence upon the pressure in a transmission-fluid line.

9 Claims, 6 Drawing Figures

CONTROL SYSTEM FOR AN INTERNAL-COMBUSTION ENGINE AND STEPLESS TRANSMISSION SYSTEM

Field of the Invention

The present invention relates to systems in which a stepless transmission is connected to an internal combustion engine and, more particularly, to a control system for an assembly which includes an internal-combustion engine and a stepless, preferably hydrostatic, transmission.

Background of the Invention

In the commonly owned U.S. Pat. No. 3,542,173, for example, and elsewhere, motor-vehicle drive systems are described in which an internal-combustion engine has its crankshaft connected to the input shaft of a stepless transmission. The output shaft of the latter is connected, in turn, to a differential or to the wheels of the vehicle by some other means, a control system may be provided for shifting a speed-changing or torque-changing member of transmission i.e. a member changing transmission ratio and, as described in the aforementioned patent, means may be provided for simultaneously operating a control member of the engine, e.g. the throttle, so that an optimum relationship of engine speed to transmission setting, and vice versa, is assured.

A hydrostatic transmission of the aforementioned type may include a hydrostatic pump having a swingable control member or plate adapted to vary the stroke of a plurality of axially extending pistons which are arrayed in an annulus in a cylinder drum.

Such transmissions are described in

| U.S. Patent | 2,975,597 |
| " | 3,142,963 |
| " | 3,163,987 |
| " | 3,279,173 |
| " | 3,542,173 |
| " | 3,672,161 and |
| " | 3,680,312 | as well as the patents cited therein.

The internal-combustion engine referred to above may be of any conventional type and generally has a control element, e.g. the throttle lever, which may be displaced to control the engine speed. The engine, more particularly, can be of the type described at pages 9 ff. of PRINCIPLES OF AUTOMOTIVE VEHICLES, U.S. Government Printing Office, Washington, D.C., 1956, the throttle member of the engine operating upon the flap of the carburetor.

In such systems, including those described in the commonly assigned prior U.S. Pat. No. 3,542,173, it has been recognized that optimum relationships exist between the setting of the transmission and the throttle position of the engine. In all of these systems, apart from the neutral or standstill position of the transmission, the control member of the engine is always associated with a particular setting of the transmission and with a particular position of the control mechanism, e.g. pedal, therefor. Of course, for normal operation of the drive and a vehicle in which the same is included, the pre-established relationship between the transmission setting and the engine setting will provide ideal results. However, when the transmission loading deviates from normal conditions as, for example, when the vehicle is being driven up a seep incline or over soft terrain of high resistance to forward travel, the increased loading requires a resetting of the internal-combustion engine and, even with control devices of the type described in U.S. Pat. No. 3,542,173, this must be done apart from the automatic control mechanism because of the fixed relationships of the setting.

Conversely, when the loading is less than normal as, for example, during the descent of the vehicle along an incline, the internal-combustion engine setting may be excessively high and the engine driven at an inordinately high speed which prevents effective engine braking. Thus, while the automatic coupling of a stepless transmission and the control member of an engine with the pedals or other operator-shiftable elements has been proved to be a significant advance over the earlier art, the fixed relationship between the settings of the various elements has proved to be disadvantageous under many conditions to which the drive is exposed.

Objects of the Invention

It is the principal object of the present invention to provide a drive, comprising an internal-combustion engine, a stepless transmission and a control mechanism therefor, whereby the aforementioned disadvantages can be obviated and wherein, more particularly, advantages of the system first described in U.S. Pat. No. 3,542,173 may be gained with the additional advantage of compensation for off-normal loading of the transmission.

Still another object of the invention is to provide a control system for a drive of the character described which ensures a more effective relationship between the settings of the transmission-control and the engine-control members.

A further object is the provision of an improved method of operating such a drive.

Summary of the Invention

These objects and others which will become apparent hereinafter are attained, in accordance with the present invention, in a drive, especially for automotive vehicles in which the driven wheels constitute the load but also for other loads, which comprises an internal-combustion engine having a control element (e.g. a throttle lever), a stepless transmission whose input shaft is connected to the crankshaft of the engine and whose output shaft is connected to the load, and a control mechanism connected to the control elements of the transmission and engine. The invention provides means responsive to the torque of a transmission shaft, preferably responding to the displacement pressure of the hydraulic medium of the transmission, for adjusting the control mechanism so that the relationship of the setting of the engine control element and the setting of the transmission control element are dependent upon the loading of the transmission.

The present invention provides a control mechanism for a drive consisting of an internal-combustion engine and a stepless hydrostatic transmission wherein the mechanism includes an input member which directly operates upon the transmission-ratio-control element and is coupled by a kinematic linkage to the speed-control element of the internal-combustion engine to achieve an improved correlation of the settings of the transmission and engine.

The kinematic linkage includes a member which is adjustable in position in dependence upon the torque of one of the transmission shafts (i.e. the input shaft between the engine and the hydrostatic pump or the output shaft between the hydrostatic motor and the load), and, preferably, upon the displacement pressure of the hydraulic medium of the transmission. This adjustment means creates a dependency of the position of the speed-control element of the internal-combustion engine and of the ratio-control element of the transmission upon the loading of the latter.

In a control system in which a stepless transmission, preferably hydrostatic, or another transmission in which the ratio-control element is shiftable to either side of a neutral position to effect operation of the load in opposite directions or in opposite senses of rotation and, further, wherein a force-transmitting connection is provided between the operator-controlled input member of the system and the elements controlling the transmission and engine, as described in U.S. Pat. No. 3,542,173, the improvement of the present invention provides for a torque regulation of the positions of the elements.

As described in the last-mentioned patent, an adjustable abutment cooperates with the speed-controlling element and becomes effective to decouple the input member from the speed-controlling element so that the input member remains coupled only with the ratio-controlling element of the transmission. Between a high transmission-speed position of the input member and the position determined by the abutment, each position of the input member corresponds to a given position of the speed-control element of the engine. However, between a low-transmission-speed position and the position determined by the abutment, the input member and speed-control element are decoupled so as to prevent stalling of the engine. The improvement of the present invention provides that the position of the speed-control element of the engine is dependent on the position of the input member and on the torque and transmission-shaft speed, i.e. a given displacement pressure of the hydraulic fluid medium in the transmission, so that it varies continuously with the torque or displacement pressure thus the relationship automatically alters to provide an optimum setting for the engine for any loading or setting of the input member.

In any hydrostatic transmission, the maximum torque which can be transferred by the transmission is limited by the maximum displacement pressure at the pressure side of the pump. This displacement pressure can, in turn, be limited by a pressure-relief valve which protects the parts of the transmission against overloading.

At standstill of the output shaft of the transmission, therefore, the maximum torque on the latter is at a given value determined by the pressure relief valve since the speed of the shaft is zero. However, as the output shaft of the transmission begins to rotate against a retarding force, i.e. a load, the product of the maximum torque and rotary speed increases. At maximum operating effectiveness, the transmission applies maximum torque to its output shaft at highest speed so that maximum power is applied to the load.

In normal cases, the greatest output of the internal combustion engine is smaller than the power-transmission capabilities of the hydrostatic transmission at maximum displacement pressure and highest rotary speed. As a result, the transmission has an operating range below its maximum speed in which the power transmission is constant over a certain range corresponding to the maximum output of the internal-combustion engine. Since in this range the product of the output shaft speed and the torque is constant, with increasing output the torque must fall, and, indeed, the characteristic curve is a hyperbola.

Where the internal-combustion engine has its speed control member set at an output speed corresponding to maximum power output, the engine in the range of small transmission output speed operates with an unsatisfactory partial loading independently of the loading and the output shaft of the internal combustion engine. With the control system described above the particular transmission loading, for example in an automotive vehicle traveling with normal loading and upon a good roadway, permits the transmission ratio to be correlated with the engine speed.

In accordance with a further feature of this invention link means is provided between the driver-controlled operating member and the speed and ratio-control elements for jointly increasing and decreasing the engine speed and the transmission speed. Control means responsive to the torque exerted by the output of the transmission on the load and connected to the link means is provided for increasing the engine speed to its maximum speed upon the torque exerted by the output on the load exceeding a predetermined limit and for decreasing the transmission speed ratio when the engine speed attains its maximum speed and the torque exceeds this predetermined limit.

This operating linkage in accordance with the present invention comprises a lever engageable at one end with the operating member and having another end connected through a lost-motion coupling to the speed control of the engines. This lost-motion coupling is provided so as to keep the engine running at a predetermined minimum speed so that it will not stall, since the ratio control element of the hydrostatic transmission can be displaced a predetermined distance from its zero setting (the position in which its output does not rotate) before it is necessary to run the engine at a faster speed than its minimum idle speed. The control means in accordance with this invention is effective on this lever either to lengthen one of the lever arms thereof, to displace its fulcrum, or otherwise affect it so that the coupling of the operating member to the speed control element depends on the torque exerted by the transmission.

According to a further feature of this invention the transmission is connected to a ram having a spring-loaded piston which is displaceable only when the pressure in the transmission exceeds a predetermined limit corresponding to maximum torque output. The above-mentioned control lever is mounted on or otherwise coupled to this piston. Thus when the pressure in the transmission rises above a predetermined level so that the spring force biasing the piston in one direction is overcome, the linkage is altered so as to change the engine speed. Once the engine speed is at a maximum the linkage is further effective to displace the ratio control element of the transmission so as to prevent over-loading of the system and stalling of the engine.

Brief Description of the Drawing

The above and other objects, features and advantages of the invention will become more readily from the following description, reference being made to the accompanying drawing in which.

SPECIFIC DESCRIPTION

Figure 1:
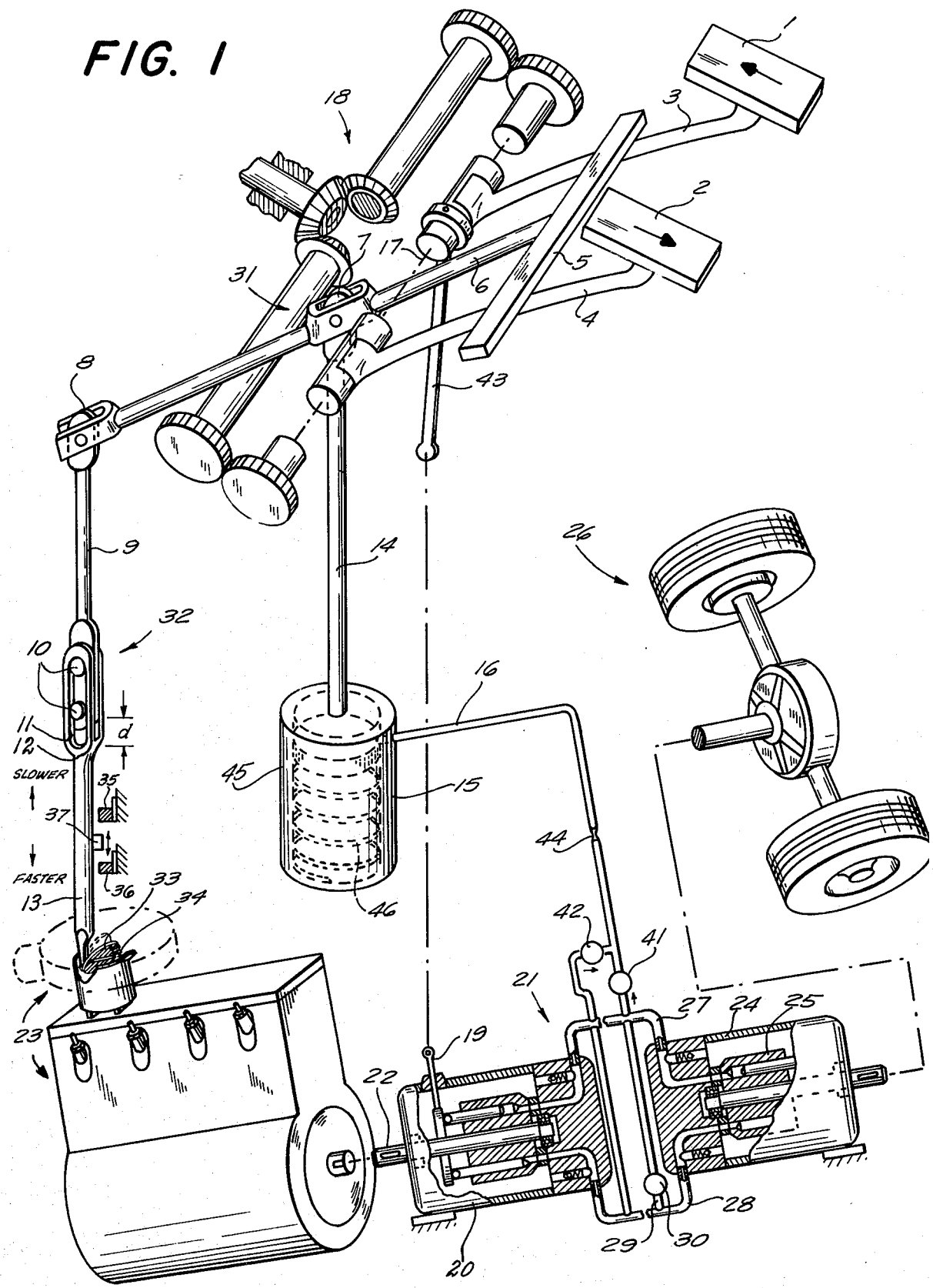
FIG. 1 is a perspective and diagrammatic view of a system in accordance with the present invention.

As shown in FIG. 1, a pedal 1 depressible to displace a vehicle such as a lift truck forward and a pedal 2 depressible to displace an vehicle backwards are mounted on respective arms 3 and 4 pivotal about an axis 17 and interconnected by gearing 18 such that depression of one of the pedals will cause the other to rise and vice versa. The pedal 1 is provided with an arm 43 connected to the control element 19 of the pump 20 of a hydrostatic transmission 21. This pump 20 is fixed by mounting and has an input shaft 22 connected to the output of an internal-combustion engine 23. Pump 20 is in closed-circuit fluid communication with a motor 24 whose rotor 25 is connected to a pair of wheels 26. The lines 27 and 28 between the pump 20 and motor 24 are bridged by another hydraulic conduit 29 in which is provided a double-acting pressure regulating valve 30 that determines the maximum pressure that can be exerted by the pump 20 and the motor 25, and therefore determines the maximum torque developable by the motor 24.

A crosspiece 5 of a linkage 31 is carried on the end of an arm 6 pivoted at 7 and having, at its other end, a pivot 8 for a rod 9 connected via a lost-motion coupling 32 to a rod 13 itself connected to the control member 33 of the carburetor of the internal-combustion engine 23. A spring 34 serves to displace the rod 13 upwardly in a direction tending to reduce the speed of the engine 23. A pair of slideable stops 35 and 36 cooperate with a projection 37 carried on the rod 13 and therefore determining the maximum and minimum operating speeds for the engine 23.

Figure 2:
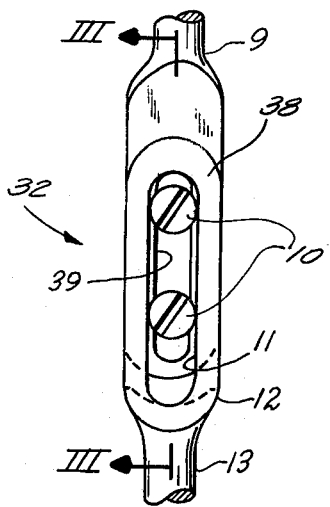
FIGS. 2 and 3 are enlarged-scale views of details of FIG. 1, FIG. 3 being a section taken along the line III—III of FIG. 2.
Figure 3:
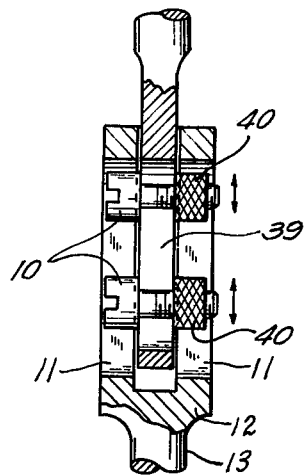

The lost-motion coupling 32, as also shown in FIGS. 2 and 3 comprises a central element 38 which is provided with two adjustable bolts 10 that can be displaced parallel to the rods 9 and 13 in a slot 39 formed in its element 38 by loosening nuts 40 carried on their ends. A fork 12 on the end of the lower rod 13 is formed with a pair of aligned slots 11 in which the bolts are reciprocal. Thus the rod 9 is displaceable by a distance d relative to the rod 13 before it displaces this rod 13.

A pair of check valves 41 and 42 connected to the conduits 27 and 28 open into a line 16 provided with a restriction 44 and opening into the upper region of a cylinder 15 provided with a piston 45 biased toward this upper region by means of a spring 46. The piston rod 14 of this piston 45 is formed as the fulcrum 7 of the lever 6.

The device operates as follows:

At standstill the engine 23 idles at a minimum speed and the control element 19 of the transmission 21 is set so that the swash plate of the pump 20 is perpendicular to its axis of rotation such that this pump 20 does not drive the motor 24 at all, and the wheels 26 are arrested.

Depression of, for example, the forward pedal 1 will displace the swash plate in a direction to start pumping and drive the motor 24 to rotate the wheels 26 so that they advance the vehicle in a forward direction. As the pedal 1 is depressed the pedal 2 will raise, lifting the crosspiece 5 and depressing the rod 9. This rod 9 will drop a distance corresponding to distance d until the lower bolt 10 comes into engagement with the lower end of the slot 11 and the rod 13 is pressed down to rotate the control element 33 of the engine 23. This lost-motion travel is necessary because the engine 23 even idle develops a useful amount of work so that its carburetor need only be advanced once the ratio control element 19 of the transmission 21 is set at such a position that the engine 23 can no longer drive the vehicle without resetting of its control element 33.

Thereafter the control elements 19 and 33 are displaced jointly so as to increase the work output of the motor 23 and to increase the input/output ratio of the transmission 21. Should the transmission 21 be subjected to a considerable load at any time before the projection 37 has abutted on the stop 36, the position corresponding to maximum speed of the engine 23, the pressure will build up in the system and become effective above the piston 45 to depress this piston 45. The force of spring 46, which force increases as the piston 45 is depressed, determines the maximum torque the motor 24 can exert on the wheel 26. This torque is slightly below that pressure at which the regulator valve 30 will begin to allow leakage between the conduits 27 and 28. As the piston 45 descends the crosspiece 5 bears down on the arm 4 of pedal 2, so that the end 8 of the lever 6 presses down on the control element 33 of the carburetor increasing the engine work output. This will increase the torque delivered until the projection 37 reaches the stop 36, whereupon the end 8 will no longer be able to descend and the crosspiece 5 will then press down on the arm 4, causing pedal 2 to be pressed down and the pedal 1 to rise, thereby displacing the control element 19 back to a less advanced position. In this manner the system will not be dangerously overloaded or loaded to the point where the engine 23 might be stalled; after a predetermined limit is passed the carburetor of the engine 23 is automatically reset and the input/output ratio of the transmission is also reset if necessary. The restriction 44 serves to prevent brief harmless shocks to the system from displacing the piston and resetting the carburetor.

Depression of the reverse pedal 2 displaces the control element 19 in the opposite direction to turn the wheels 26 backwards, but otherwise the operation in the reverse mode is identical to that in the forward mode.

Figure 4:
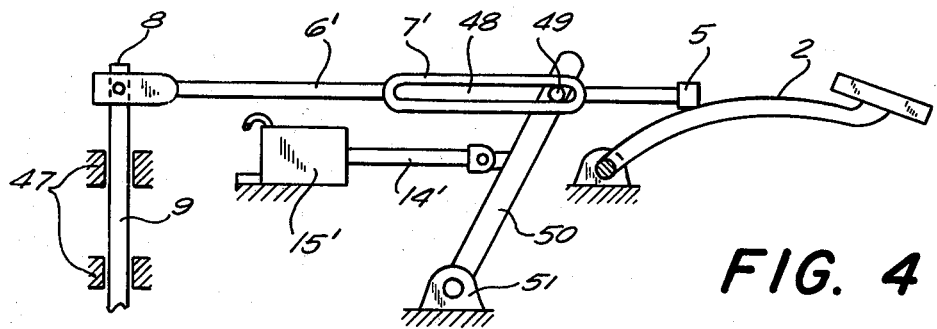
FIGS. 4 and 5 are side diagrammatic views illustrating other linkages in accordance with the present invention.
Figure 5:
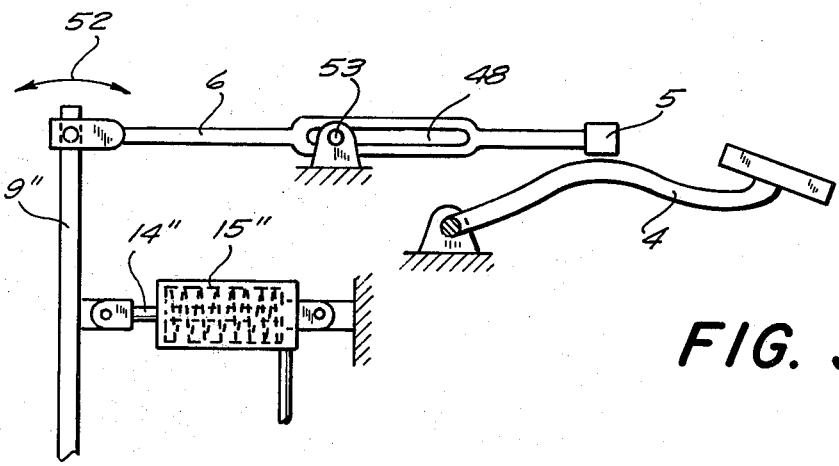

FIG. 4 shows an arrangement where the rod 9 is snugly held between guides 47 and the lever 6' is pivoted at 7' in an elongated slot 48 formed in the center of this lever and in which is slideable a pin 49 carried on an arm 50 fixedly pivoted at 51 and displaceable by the piston rod 14' of the cylinder 15'. Thus the effective length of the lever arms to either side of the fulcrum 49 can be altered by the ram in the cylinder 15'. FIG. 5 shows an arrangement where the cylinder 15'' has its piston rod 14'' pivoted on the rod 9'' which as shown by double headed arrow 52 is displaceable so as to allow a lever 6 identical to the lever of FIG. 4 to slide on a fixed pivot 53, thereby also changing the effective length of the lever to other side of the pivot 53.

Figure 6:
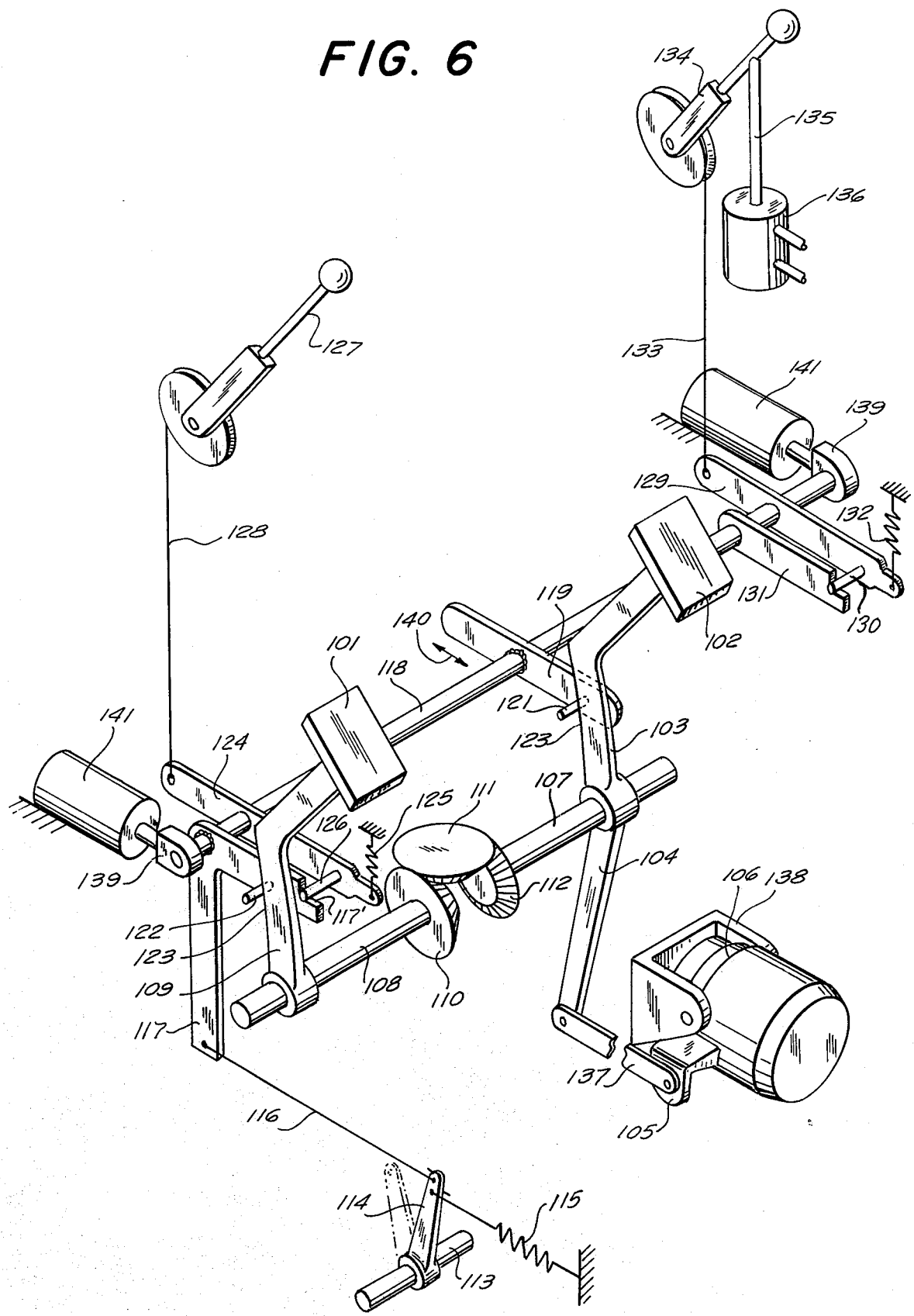
FIG. 6 is a perspective and diagrammatic view of a further arrangement in accordance with this invention.

The arrangement of FIG. 6 illustrates the principal parts of a drive system for a fork lift. Here a pair of pedals 101 and 102 are carried on respective arms 109 and 103 mounted on respective axles 108 and 107 carrying respective bevel gears 110 and 112 interconnected by another bevel gear 111 so that rotation of the one shaft 107 in one direction will rotate the other shaft 108 in the opposite direction and vice versa. A link 137 connects the other end 104 of the lever 103 to a lug 105 on a pump 106 so that pivoting of this pump 106 on its bracket 138 will change its output, the lug 105 thereby constituting the control element. Each of the pedal-mounting arms 103 and 109 is formed with a respective surface 123 engageable with a respective pin 121, 122 carried on a lever 119, 117 rotationally secured to a shaft 118 pivoted at its ends in a pair of like journal blocks 139 displaceable as shown by double-headed arrow 140. A pair of pistons in cylinders 141 are operatively connected to the pump 106 so as to displace this shaft 118 back and forth in the manner described above with reference to rams in cylinders 15, 15' and 15''. The lever 117 is connected via a cable 116 to an operating lever 114 secured to a shaft 113 that operates the carburetor of the engine. A spring 115 is provided to bias the lever 114 into the low-speed position.

In addition another lever 124 freely pivoted on the shaft 118 is provided at one end with a laterally projecting pin 126 engageable with a notch 117' formed in the double-armed lever 117. A hand lever 127 is connected via a cable 128 to that end of the lever 124 opposite its end carrying the pin 126 and pulled by means of a spring 125 away from the notch 117'. Thus this lever 127 can be used to manually set the minimum engine speed.

A similar lever 129 is provided with a pin 130 and biased by a spring 132 so as to operate another arm 131 carried on the shaft 118. Another cable 133 connects this lever 129 to another hand lever 134 also connected to the piston rod 135 of a valve 136. Operation of this lever 134 serves in this case to raise the forks of the fork lift, so that engine speed here is increased when the fork lift is raised without causing operation of the pump 106.

In the systems according to the present invention the torque exerted at the output of the hydrostatic transmission in part determines the work output or speed of the combustion engine driving this transmission. Thus when the torque output reaches a predetermined limit the engine speed will be increased, and, should this be insufficient to raise the load and move the vehicle so as to reduce the torque, the input/output ratio of the transmission will be automatically changed so as to move the vehicle more slowly and/or lift the load more slowly. Such an arrangement almost completely obviates the problem of stalling when trying to lift very heavy loads. At the same time this arrangement insures that the work done by the combustion engine will be most efficiently used, causing a considerable reduction in fuel consumption while doing many jobs much more rapidly than has been hitherto possible.

I claim:
1. A method of operating a drive system wherein a combustion engine whose speed is variable up to a predetermined maximum speed drives the input of a hydrostatic transmission whose output is connected to a load and whose input/output speed ratio is steplessly variable, said engine and said transmission each having a speed control element respectively displaceable for varying said engine speed and said ratio, and a linkage including a lever between an operating member and the engine control element connects said member to said elements, said method comprising the steps of:

jointly increasing the engine speed and the transmission speed ratio when the torque exerted by said output on said load is below a predetermined limit;
automatically increasing only said engine speed when said torque is above said level and said engine speed is below said maximum speed;
automatically decreasing said transmission speed ratio only when said torque is above said predetermined level and said engine is at said maximum speed until said torque drops below said level; and
monitoring the hydraulic pressure in said transmission to determine the torque exerted on said load, said predetermined level being a predetermined fluid pressure level, said engine speed being increased and said transmission speed ratio being decreased by displacement of the fulcrum of said lever.

2. In a drive system wherein a combustion engine with a speed-control element is connected to the input of a stepless transmission whose output exerts torque on a load and which is provided with a ratio control element for varying the speed ratio between said input and output, and wherein an operating member is connected through a linkage to both of said control elements to increase and decrease engine speed and torque at said output jointly, the improvement comprising a control system including means responsive to the torque at said output and connected to said linkage for displacing one of said control elements in accordance with the output torque, said ratio control element being displaceable between a position corresponding to minimum torque output of said transmission and a position corresponding to maximum output speed of said transmission, said speed control element being displaceable between a position corresponding to minimum engine speed and a position corresponding to maximum engine speed, said means advancing said engine control element toward the position corresponding to maximum engine speed on said ratio control element being in said position corresponding to maximum output speed and said torque at said output exceeding a predetermined limit, said linkage including a lever interconnecting said control elements and having a fulcrum shiftable along said lever in response to the torque at said output.

3. In a drive system wherein a combustion engine has a control element displaceable into an end position corresponding to a maximum engine speed and a steplessly variable transmission has its input connected to said engine and an output adapted to exert torque on a load, a control element on said transmission serving to adjust the speed ratio between said input and output, the improvement comprising:
an operating member;
link means between said operating member and said control elements for jointly increasing and decreasing the engine speed and the transmission speed ratio; and
control means responsive to the torque exerted by said output on said load and connected to said link means for increasing said engine speed on said torque exceeding a predetermined limit and for decreasing said transmission speed ratio on said engine speed reaching said maximum speed and said torque exceeding said predetermined limit, said control element of said transmission being displaceable from a position corresponding to no torque exerted on said load, said link means further comprising a lost-motion coupling connected to said control element of said engine and operable to displace the engine control element only after a predetermined displacement of the transmission control element from the no-torque position.

4. In a drive system wherein a combination engine has a control element displaceable into an end position corresponding to a maximum engine speed and a steplessly variable transmission has its input connected to said engine and an output adapted to exert torque on a load, a control element on said transmission serving to adjust the speed ratio between said input and output, the improvement comprising:

an operating member;

link means between said operating member and said control elements for jointly increasing and decreasing the engine speed and the transmission speed ratio; and control means responsive to the torque exerted by said output on said load and connected to said link means for increasing said engine speed on said torque exceeding a predetermined limit and for decreasing said transmission speed ratio on said engine speed reaching said maximum speed and said torque exceeding said predetermined limit, said link means includes links positively connecting said member to said transmission control element and at least one lever having a pair of arms connected to said member and said lost-motion coupling, respectively.

5. The improvement defined in claim 4 wherein said control means includes a fulcrum for said lever and means for displacing said fulcrum relative to said lever.

6. The improvement defined in claim 4 wherein said transmission is hydrostatic and said control means includes a piston in fluid communication with said transmission and displaceable on fluid pressure therein rising above a predetermined limit.

7. The improvement defined in claim 5 wherein said control means includes a cylinder subdivided into two chambers by said piston, and a spring urging said piston toward one of said chambers, said one chamber being in fluid communication with said transmission.

8. The improvement defined in claim 7 wherein said operating member is adapted to be effective on said spring in one direction with a predetermined maximum force, said spring exerting a force in the opposite direction greater than said maximum force.

9. A method of operating a drive system wherein a combustion engine having an engine control element capable of varying the engine speed up to a predetermined maximum speed, drives the input of a continuously variable transmission having a control element for a transmission speed ratio, the transmission having an output connected to a load and the control elements being linked by a lever to increase and decrease engine speed and torque at said output, the improvement which comprises controlling the relationship between the variation in speed of said engine and the change in torque at said output by shifting the fulcrum of said lever along the lever.

* * * * *